United States Patent [19]

Lewis, Jr.

[11] 4,003,986
[45] Jan. 18, 1977

[54] PROCESS FOR PRODUCING SULFUR FROM SULFUR DIOXIDE OR AMMONIUM SULFITES

[76] Inventor: George W. Lewis, Jr., 8138 Lockwood Lane, Indianapolis, Ind. 46217

[22] Filed: Oct. 6, 1975

[21] Appl. No.: 620,024

Related U.S. Application Data

[63] Continuation-in-part of Ser. No. 340,963, March 14, 1973, Pat. No. 3,928,536.

[52] U.S. Cl. .......................... 423/567 A; 423/356; 423/242; 423/569
[51] Int. Cl.² .................... C01B 17/00; C01C 1/02
[58] Field of Search .......... 423/242, 356, 567, 569

[56] References Cited
UNITED STATES PATENTS

| | | | |
|---|---|---|---|
| 2,090,828 | 8/1937 | Beckman | 423/569 |
| 3,882,222 | 5/1975 | Daschamps et al. | 423/242 |
| 3,883,638 | 5/1975 | Renault et al. | 423/242 |
| 3,883,643 | 5/1975 | Renault et al. | 423/242 |

FOREIGN PATENTS OR APPLICATIONS 419,788   11/1934   United Kingdom .............. 423/569

*Primary Examiner*—Earl C. Thomas
*Assistant Examiner*—Gregory A. Heller
*Attorney, Agent, or Firm*—Woodard, Weikart, Emhardt & Naughton

[57] ABSTRACT

A method is disclosed for treating flue gas and the like for sulfur dioxide removal and sulfur recovery. The flue gas, containing a minor but polluting amount of sulfur dioxide, is contacted with ammonia in a reaction chamber. The reaction product is caused to precipitate onto a heat sink where it is mechanically removed on a continuous basis. The removed compounds are recycled by subjecting them either in solid or vaporized form to carbon monoxide between 140° F and 600° F to obtain sulfur and ammonia.

6 Claims, 1 Drawing Figure

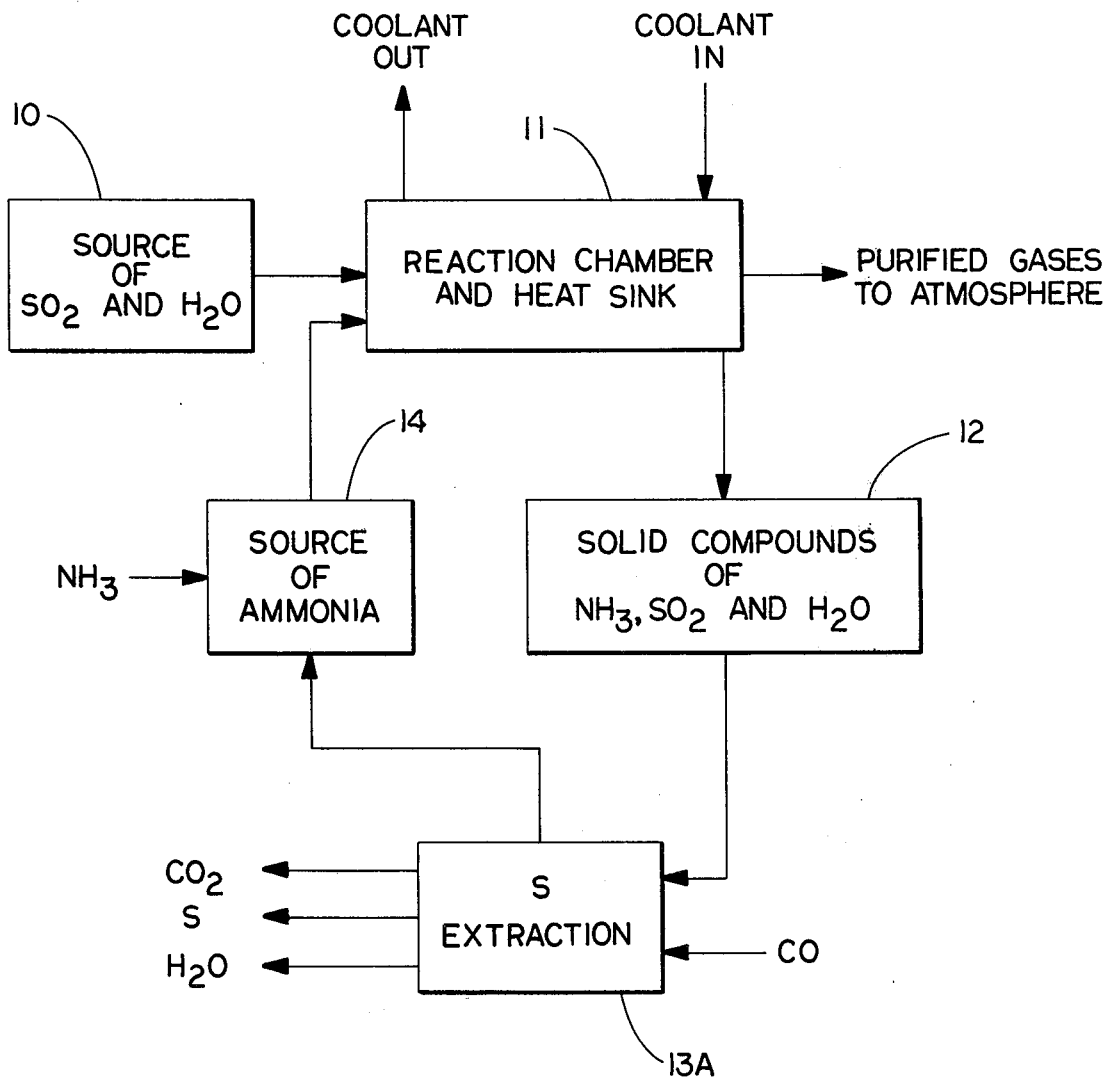

PROCESS FOR PRODUCING SULFUR FROM SULFUR DIOXIDE OR AMMONIUM SULFITES

CROSS-REFERENCE TO RELATED APPLICATION

This is a continuation in part of U.S. patent application Ser. No. 340,963, filed Mar. 14, 1973 by George W. Lewis, Jr. and entitled Process for Removal of Sulfur Dioxide from Gases now U.S. Pat. No. 3,928,536.

DESCRIPTION OF THE PRIOR ART

1. Field of the Invention

This invention relates to the treatment of gases containing sulfur dioxide in order to reduce the sulfur dioxide content of the gas and for recovery of sulfur.

2. Background of the Invention

Many processes for removal of sulfur dioxide from combustion gases and the like have used ammonia by injecting the ammonia into the gases and thereafter passing the gases through a water spray to dissolve compounds of ammonia and sulfur dioxide which form. Because of the exposure of the aqueous solutions of these compounds to the air, much of the compounds which form become oxidized to form ammonium sulfates. Recycling of these sulfate compounds is much more difficult than recycling of the unoxidized compounds.

To overcome this problem of oxidation and to eliminate some of the disadvantages associated with the large amounts of water used in conventional processes, Cann, in U.S. Pat. No. 3,579,296, describes a process which does not use water spray to remove the ammonia and sulfur dioxide from the gases. The method of Cann removes the solids which form as a suspension in the gases with either a cyclonic separator or filter, and an electrostatic precipitator. The gases in Cann's process pass through the reaction chamber at such a high rate that substantially no materials deposit on walls of the reaction chamber; but rather, substantially all solid materials formed remain suspended in the gases. Cann also has found it desirable to recycle some of the solid materials which he removes from the gases with his separation devices. The regeneration of ammonia in this process is accomplished by the anaerobic addition of the solid materials separated to alkaline earth metal oxides dissolved in water. The processes of the prior art often involve two or three separate processes and thus are relatively expensive.

U.S. Pat. Nos. 3,524,720 to Bauer and 3,533,748 to Finfer et al each disclose processes for obtaining elemental sulfur from sulfur dioxide present in flue gases and the like. These processes involve the addition of carbon monoxide to metal sulfites at very high temperatures. They are expensive processes due in part to the very high temperatures involved and substantial transport of solid materials.

SUMMARY OF THE INVENTION

The invention relates broadly to a process for producing sulfur by adding carbon monoxide to sulfur dioxide or ammonium sulfite compounds at relatively low temperatures. This can result in the direct production of solid or liquid sulfur thereby simplifying separation of the sulfur from the other resulting products which are gaseous.

The invention can be applied to recycle ammonium sulfite compounds obtained from the flue gases by passing carbon monoxide through the solids to produce ammonia for recycling and sulfur in elemental form for easy shipment and storage. The recycling method is very inexpensive and simple and overcomes many of the problems of the prior art recycling processes.

BRIEF DESCRIPTION OF THE DRAWING

FIG. 1 is a block diagram of the invention.

DESCRIPTION OF THE PREFERRED EMBODIMENT

Referring in particular to FIG. 1 there is illustrated a source of $SO_2$ and $H_2O$ 10 which can be combustion gases from sulfur-containing fuels such as coal, fuel oil or natural gas or from any other source of gases containing sulfur dioxide and water vapor, such as may be derived from the roasting of sulfur-containing ores, smelting operations, or metal casting operations. These gases are passed through a reaction chamber and heat sink 11 where they react with ammonia from a source of ammonia 14. The reaction chamber and heat sink 11 has a relatively large surface maintained below the temperature of the gases. In most instances the temperature of the large surface will need to be below 200° F and preferably the temperature of the large surface will be maintained at about 170° F. This large surface maintained at such a temperature will cause solids to precipitate from the gases. The gases are then allowed to pass to the atmosphere and the precipitated solids are continuously removed and accumulated in a storage area 12.

The solid compounds removed include primarily ammonium bisulfite, ammonium pyrosulfite, and ammonium sulfite. Additionally fly ash may be present but this can be removed either prior to precipitation or subsequent to precipitation through conventional means well known in the art. Details of the process and apparatus for removing sulfur dioxide from flue gas and the like are disclosed in U.S. patent application Ser. No. 340,963, filed Mar. 14, 1973 by George W. Lewis, Jr. which is hereby incorporated by reference. The principal reactions which are involved can be described generally as follows:

(1) $NH_3 + H_2O + SO_2 \rightarrow NH_4HSO_3$ (ammonium bisulfite)

(2) $2NH_3 + H_2O + 2SO_2 \rightarrow (NH_4)_2S_2O_5$ (ammonium pyrosulfite)

(3) $2NH_3 + H_2O + SO_2 \rightarrow (NH_4)_2SO_3$ (ammonium sulfite)

The method for recycling the solid compounds from storage area 12 is characterized by item 13A. In this method, carbon monoxide at a temperature above 140° F and below 600° F, and preferably at 200° F is passed through the solid compounds from storage area 12 in the absence of oxygen until substantially all of the solid compounds have been converted to sulfur and ammonia. Alternatively, the vaporized compounds may be reacted with the carbon monoxide in the absence of oxygen at a temperature below 600° F. Ideally temperatures are used which result in the formation of solid sulfur (between 140° F and 250° F). The solid compounds from storage area 12 may be ammonium sulfite, ammonium pyrosulfite, ammonium bisulfite or any combination of the two or more of these ammonium compounds. The principal reactions which are involved can be described generally as follows:

(4) $NH_4HSO_3 + 2CO \rightarrow NH_3 + H_2O + 2CO_2 + S$
(5) $(NH_4)_2S_2O_5 + 4CO \rightarrow 2NH_3 + H_2O + 4CO_2 + 2S$
(6) $(NH_4)_2SO_3 + 2CO \rightarrow 2NH_3 + H_2O + 2CO_2 + S$ These reactions preferably occur in a fluidized bed of finely divided solids through which the carbon monoxide is circulated. Alternatively, the solids are vaporized upon addition of carbon monoxide. This reaction can be considered to be between the above mentioned compounds and carbon monoxide but theoretically it involves simply:

(7) $SO_2 + 2CO \rightarrow 2CO_2 + S$ in the presence of ammonia and water vapor. The ammonia recovered is used as a source of ammonia 14 for continuing the purification process.

EXAMPLE

Twenty kilograms of ammonia-and-sulfur-dioxide compounds are obtained in finely divided solid form by precipitation from coal combustion gases to which ammonia has been added. This is accomplished using the teachings and apparatus of said U.S. patent application Ser. No. 340,963, filed Mar. 14, 1973. Carbon monoxide is circulated through the compounds in a fluidized bed of the compounds maintained at 200° F in the absence of oxygen. The gases emanating from the discharge end of the bed are returned to the combustion gases and passed through the apparatus of said patent application to reuse the ammonia liberated and to reclaim any sulfur dioxide present. Sulfur in finely divided solid form is generated in the fluidized bed and substantially all of the ammonia-and-sulfur-dioxide compounds are consumed by the reaction.

Thus, there has been provided, in accordance with above described preferred embodiment, a highly efficient and simple method for purification of gases containing sulfur dioxide impurities. While there have been described above the principles of this invention in connection with a specific process, it is to be clearly understood that this description is made only by way of example and not as a limitation to the scope of the invention.

Not only can this reaction of carbon monoxide with the ammonium sulfite material proceed with pure or highly concentrated carbon monoxide, but additionally, a gaseous mixture containing nitrogen, carbon monoxide and water vapor in addition to carbon monoxide at relatively low concentration can also be used.

What is claimed is:

1. A process for producing ammonia and sulfur which comprises subjecting a first solid substance selected from the group consisting of ammonium sulfite, ammonium pyrosulfite, ammonium bisulfite, and a mixture of any two or more of said compounds to carbon monoxide gas at a temperature above 140° F and below 250° F and in the absence of oxygen until substantially all of said first substance has been converted to ammonia and sulfur, and recovering the ammonia and sulfur produced.

2. The process of claim 1 in which the temperature of said subjecting is at about 200° F.

3. The process of claim 1 in which said first substance is in finely divided solid form.

4. A continuous process for reducing $SO_2$ content of contaminated gases containing $SO_2$ and water vapor which comprises:
   a. adding ammonia to the contaminated gases;
   b. removing the ammonium compounds which form;
   c. subjecting as a solid phase the ammonium compounds which form to carbon monoxide at a temperature above 140° F and below 250° F and in the absence of oxygen, whereby ammonia and sulfur and carbon dioxide will be produced;
   d. recovering the sulfur produced and
   e. adding the ammonia produced to the contaminated gases in continuing the process.

5. The process of claim 4 in which the temperature of said subjecting is at about 200° F.

6. The process of claim 4 in which said ammonium compounds are in finely divided solid form.

* * * * *